F. N. G. KRANICH.
CORN HUSKER SHREDDER.
APPLICATION FILED AUG. 10, 1914.
1,142,181.
Patented June 8, 1915.
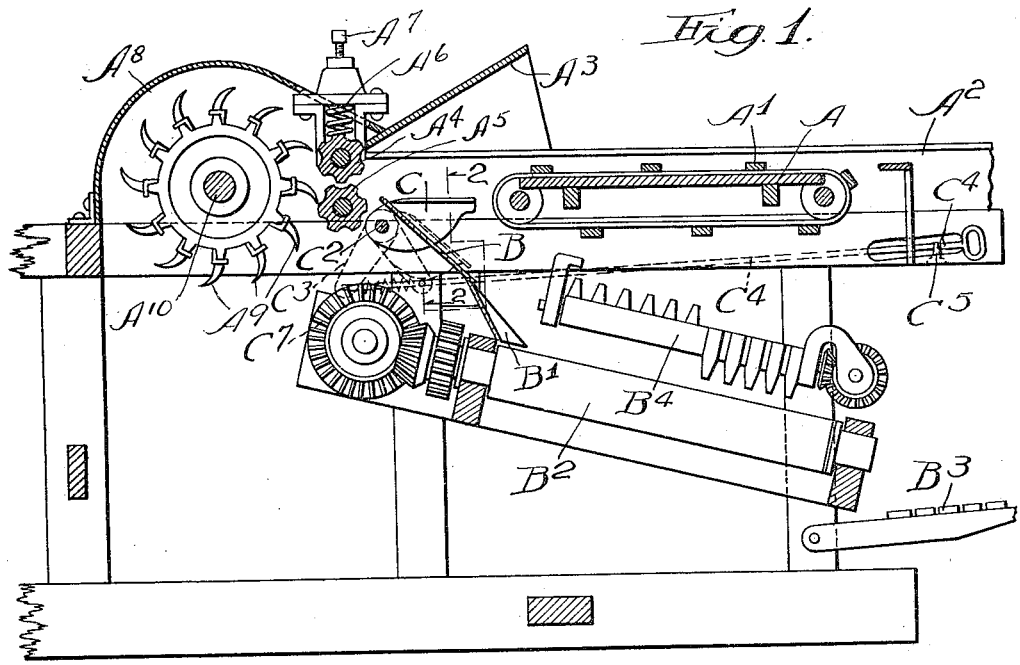
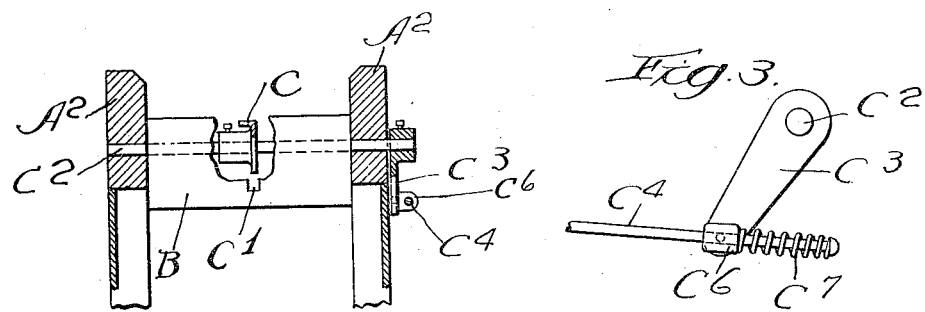
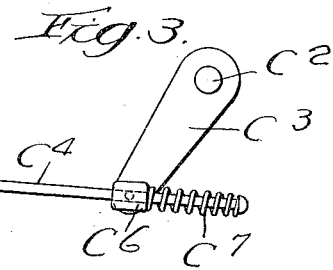
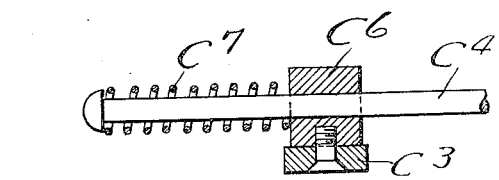
Witnesses:
Inventor:
Frank N. G. Kranich
by Parker & Carter
his Attys.

UNITED STATES PATENT OFFICE.

FRANK N. G. KRANICH, OF LAPORTE, INDIANA, ASSIGNOR TO M. RUMELY CO., OF LAPORTE, INDIANA, A CORPORATION OF INDIANA.

CORN HUSKER-SHREDDER.

1,142,181. Specification of Letters Patent. Patented June 8, 1915.

Application filed August 10, 1914. Serial No. 855,957.

*To all whom it may concern:*

Be it known that I, FRANK N. G. KRANICH, a citizen of the United States, residing at Laporte, in the county of Laporte and State of Indiana, have invented a certain new and useful Improvement in Corn Husker-Shredders, of which the following is a specification.

My invention relates to improvements in corn husker-shredders and has for one object to provide means for preventing clogging of the machine.

It is illustrated more or less diagrammatically in the accompanying drawing, wherein—

Figure 1 is a longitudinal section; Fig. 2 is a section on the line 2—2 of Fig. 1; Fig. 3 is a detail of the finger operating lever; and Fig. 4 is a detail plan section of the same on an enlarged scale.

Like parts are indicated by like letters throughout the several figures.

I have illustrated my device as applied to a well-known husker-shredder more or less diagrammatically. It consists of the table A along which travels the feed carrier $A^1$ driven by any suitable means not here shown between the side walls of the table $A^2$. The corn stalks are fed on this table and carried by the carriers into the guide hood $A^3$ and are fed into the space between the snapping rolls $A^4$, $A^5$. These snapping rolls are corrugated as indicated yieldingly pressed together by the spring $A^6$ and may be adjusted by the set screw $A^7$ and driven by any suitable means not here shown. The function of these rolls is to snap the ears of corn off of the stalks and allow the stalks to pass through into the interior of the shredder hood $A^8$ where they are shredded by the knife $A^9$ on the shaft $A^{10}$. The ears of corn drop down from the snapping rolls as they cannot pass between them, onto the inclined table B. Thence they slide down the guide passage $B^1$ to the husking rolls $B^2$ which tear the husks off the ears in the usual manner and allow the ears to pass on and discharge into the platform $B^3$ being controlled in their passage both before and while being husked by the spring retarder fingers $B^4$.

The ears of corn vary in length and it is only necessary to have the gap between the ends of the carrier and the snapping rolls long enough to permit the longest ears of corn to drop down.

To prevent clogging due to the dropping down of material other than ears of corn between the carrier and the snap rollers I provide the fingers C which project up through slots in the table B. These fingers are mounted upon the shaft $C^2$ and may assume the position shown in dotted lines in Fig. 1 parallel with the plate B. Normally they will be in the position shown in full lines and form a table to support the material as it travels across the gap between the carriers and to the snapping rolls. The distance between these fingers is sufficient to permit the ears to pass between them to the husking rolls and they usually provide sufficient support to prevent clogging between the carrier and the rolls by allowing the stalks to pass through the snapping rolls. These fingers are controlled by the lever $C^3$, the controlling rod $C^4$ and lock $C^5$. This rod $C^4$ is in slidable relation with the block $C^6$ on the lever $C^3$ and the spring $C^7$ is interposed between the block and the end of the rod so that in case of too great pressure upon the fingers they will be free to yield thus instead of packing the material the pressure will be released and the material will gradually free itself by being discharged toward the husking rolls.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows: The corn from the field is fed onto the carrier in the usual manner. The carrier carries the corn stalks with the ears still attached toward the snapping rolls. The corn stalks being thin and small compared with the rolls pass between them. The ears will be broken or snapped off and then will drop down past the corn stalks and down the inclined table to the husking rolls. The corn stalks go on through the snapping rolls and are shredded by knives. The ears of corn with the husks on them will travel longitudinally down the husking rolls. These rolls rotate and are so close together that the corn cannot pass through, but the rolls by hooks or other suitable means grip the husks which are then caught between the rolls and drawn down away from the ears. The spring supported fingers which I have shown project upwardly from the inclined table are normally held in position and guide the mass of corn as it travels across the gap between the end of the carrier and snapping rolls, but since these fingers are separated the corn ears will be free to drop down and pass to the snapping rolls without interference, while the mass of stalks and the like will be guided into the snapping rolls and the minimum of material other than of the corn ears will be dropped down to the husking rolls. These fingers may be retracted at the will of the operator as for instance when the material has piled up in the space in front of the snapping rolls. Since these fingers are spring held when the pressure becomes too great the fingers themselves will drop down and permit the excess of material to pass downwardly in front of the snapping rolls.

I claim:

1. In a corn husker shredder the combination of snapping rolls and a carrier having a gap between them with an inclined table beneath the gap and husking rolls toward which it leads, a series of fingers projecting upwardly through the inclined plate and means for holding the upper surface of said fingers in a substantially horizontal position to serve as a conveyer table between the carrier and the snapping rolls.

2. In a corn husker shredder the combination of snapping rolls and a carrier having a gap between them with an inclined table beneath the gap and husking rolls toward which it leads, a series of fingers projecting upwardly through the inclined plate and yielding means for holding the upper surface of said fingers in a substantially horizontal position to serve as a conveyer table between the carrier and the snapping rolls.

3. In a corn husker shredder the combination of snapping rolls and a carrier having a gap between them with an inclined table beneath the gap and husking rolls toward which it leads, a series of fingers projecting upwardly through the inclined plate and means for holding the upper surface of said fingers in a substantially horizontal position to serve as a conveyer table between the carrier and the snapping rolls and means for positively retracting the fingers during operation and without interfering with the operation of the machine.

4. In a corn husker shredder the combination of snapping rolls and a carrier having a gap between them with an inclined table beneath the gap and husking rolls toward which it leads, a series of fingers projecting upwardly through the inclined plate and yielding means for holding the upper surface of said fingers in a substantially horizontal position to serve as a conveyer table between the carrier and the snapping rolls and means for positively retracting the fingers during operation and without interfering with the operation of the machine.

5. In a corn husker shredder the combination of a carrier with snapping rolls, the same separated by a gap, husking rolls on a lower level, an inclined plate beneath the gap leading from the snapping rolls to the husking rolls and fingers pivotally mounted in the gap and separated so as to permit ears of corn to pass therebetween, said fingers mounted so as to form a horizontal guide table between the carrier and the snapping rolls.

6. In a corn husker shredder the combination of a carrier with snapping rolls, the same separated by a gap, husking rolls on a lower level, an inclined plate beneath the gap leading from the snapping rolls to the husking rolls and fingers pivotally mounted in the gap and separated so as to permit ears of corn to pass therebetween, said fingers mounted so as to form a horizontal guide table between the carrier and the snapping rolls and yielding means to yieldingly hold the fingers in such horizontal position.

7. In a corn husker shredder the combination of a carrier with snapping rolls, the same separated by a gap, husking rolls on a lower level, an inclined plate beneath the gap leading from the snapping rolls to the husking rolls and fingers pivotally mounted in the gap and separated so as to permit ears of corn to pass therebetween, said fingers mounted so as to form a horizontal guide table between the carrier and the snapping rolls, yielding means to yieldingly hold the fingers in such horizontal position and means for positively retracting the fingers during the operation of the machine.

In testimony whereof, I affix my signature in the presence of two witnesses this 20th day of July, 1914.

FRANK N. G. KRANICH.

Witnesses:
R. R. LEONARD,
CHRIS. NYBERG.

Copies of this patent may be obtained for five cents each, by addressing the "Commissioner of Patents, Washington, D. C."